United States Patent
Iida et al.

(10) Patent No.: US 7,206,192 B2
(45) Date of Patent: Apr. 17, 2007

(54) SOLID ELECTROLYTIC CAPACITOR AND FABRICATION METHOD THEREFOR

(75) Inventors: Takahisa Iida, Hirakata (JP); Mutsumi Yano, Hirakata (JP); Mamoru Kimoto, Hirakata (JP); Yasumi Kobayashi, Yawata (JP); Hiroshi Nonoue, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/356,021

(22) Filed: Feb. 17, 2006

(65) Prior Publication Data

US 2006/0187618 A1 Aug. 24, 2006

(30) Foreign Application Priority Data

| Feb. 23, 2005 | (JP) | ............... 2005-046342 |
| Jan. 25, 2006 | (JP) | ............... 2006-016018 |

(51) Int. Cl.
  *H01G 4/06* (2006.01)
  *H01G 9/04* (2006.01)
(52) U.S. Cl. ....................... 361/524; 361/528
(58) Field of Classification Search ........... 361/524, 361/528–529
See application file for complete search history.

(56) References Cited

U.S. PATENT DOCUMENTS

| 6,215,652 B1 | 4/2001 | Yoshida et al. |
| 6,956,732 B1* | 10/2005 | Yano et al. ............ 361/524 |
| 7,038,902 B2* | 5/2006 | Takatani et al. ....... 361/524 |
| 2006/0133014 A1* | 6/2006 | Yano et al. ............ 361/524 |

FOREIGN PATENT DOCUMENTS

| JP | 6-151258 | 5/1994 |
| JP | 11-329902 | 11/1999 |
| JP | 2004-18966 | 1/2004 |

* cited by examiner

*Primary Examiner*—Eric W. Thomas
(74) *Attorney, Agent, or Firm*—Westerman, Hattori, Daniels & Adrian, LLP.

(57) ABSTRACT

A solid electrolytic capacitor comprising: an anode of valve metals or alloy of which main component is valve metals; a dielectric layer formed by anodizing the anode; and a cathode formed on the dielectric layer, wherein the dielectric layer comprises a first dielectric layer located on the anode side and a second dielectric layer formed on the first dielectric layer, and oxygen concentration of the second dielectric layer is decreased from the first dielectric layer side toward the cathode side.

7 Claims, 5 Drawing Sheets

F i g. 5
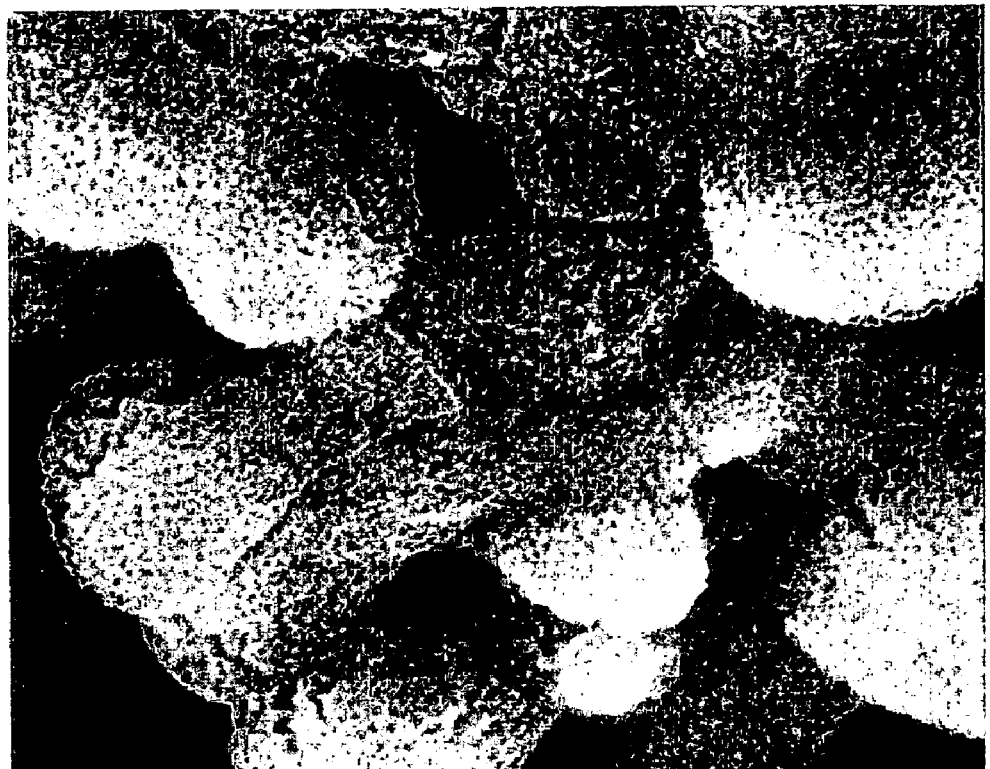

SOLID ELECTROLYTIC CAPACITOR AND FABRICATION METHOD THEREFOR

RELATED APPLICATION

The priority application Numbers Japanese Patent Application 2005-46342 and 2006-16018 upon which this application is based are hereby incorporated by reference.

BACKGROUND OF THE INVENTION

1. Field of the Invention

The present invention relates to a solid electrolytic capacitor, the solid electrolytic capacitor comprising an anode of valve metals or alloy of which main component is such valve metals, a dielectric layer formed by anodizing said anode, and a cathode formed on said dielectric layer. More particularly, a feature of the invention is to prevent increase of leakage current in heat treatment process, such as reflow soldering process, and to increase capacitance.

2. Description of the Related Art

Generally, it has been proposed to fabricate a solid electrolytic capacitor by: anodizing an anode of valve metals, such as titanium, niobium, tantalum and the like or of alloy of which main component is such valve metals, in phosphate solution to form a dielectric layer of oxide on the anode surface; overlaying an electrolyte layer composed of an oxide having a conductivity or a conductive polymer on the dielectric layer; and overlaying a carbon layer and a silver paint layer as a cathode on the electrolyte layer. (See, for example, Japanese Published Unexamined Patent Application No.6-151258 and Japanese Published Unexamined Patent Application No. 2004-18966.)

However, the dielectric layer of oxide in such a solid electrolytic capacitor is easily affected by heat. Especially, the dielectric layer formed by anodizing an anode using niobium or titanium is easy to be greatly affected by heat, and there has been a problem when heat treatment process, such as reflow soldering process, is conducted, a crack in the dielectric layer occurs, for example, by expansion and contraction of the electrolyte layer, or increase of leakage current is caused, for example, by crystallization of the dielectric layer.

In recent years, in order to provide a solid electrolytic capacitor having little changes in capacitance by heating of a reflow soldering process, a solid electrolytic capacitor in which a dielectric layer composed of a niobium oxide layer and a niobium nitride region is formed on the surface of an anode of niobium has been proposed. (See, for example, Japanese Published Unexamined Patent Application No. 11-329902.)

Nevertheless, a problem in the above-described solid electrolytic capacitor in which the dielectric layer composed of the niobium oxide layer and the niobium nitride region is formed on the surface of the anode of niobium has been that it is still impossible, in the case of reflow soldering process, to fully suppress occurrence of the crack in the dielectric layer or of crystallization of the dielectric layer which result in increase of leakage current.

SUMMARY OF THE INVENTION

It is an object of the present invention to suppress occurrence of a crack in a dielectric layer or of crystallization of the dielectric layer and thereby provide a solid electrolytic capacitor fully preventing increase of leakage current, even in a heat treatment process, such as reflow soldering process.

Another object of the present invention is to increase the surface area of an anode and thereby to increase capacitance of a solid electrolytic capacitor.

According to the invention, a solid electrolytic capacitor comprises: an anode of valve metals or of alloy of which main component is valve metals; a dielectric layer formed by anodizing said anode; and a cathode formed on said dielectric layer; wherein the dielectric layer comprises a first dielectric layer located on the anode side and a second dielectric layer formed on said first dielectric layer; and oxygen concentration of said second dielectric layer is decreased from the first dielectric layer side toward the cathode side.

In the solid electrolytic capacitor, it is preferable that at least one of elements selected from silicon, phosphorus, titanium, niobium and germanium is contained, in addition to nitrogen and fluorine, in the second dielectric layer. Especially, it is more preferable that silicon and germanium are contained.

Further, in the solid electrolytic capacitor, it is preferable that fluorine is contained in the first dielectric layer and fluorine concentration therein is increased toward the anode side.

According to fabrication method of a solid electrolytic capacitor of the present invention, the solid electrolytic capacitor comprising an anode of valve metals or of alloy of which main component is valve metals, a dielectric layer formed by anodizing said anode, and a cathode formed on said dielectric layer, the anode is anodized in an aqueous electrolyte including hexafluoride ion.

It is possible to use as hexafluoride ion added to said aqueous electrolyte, an ammonium salt represented by the general formula $(NH_4)_x MF_6$ wherein M is an element selected from phosphorus, silicon, niobium, titanium, germanium and zirconium. As such an aqueous electrolyte including hexafluoride ion, it is possible to use an aqueous electrolyte including an ammonium salt, for example, ammonium hexafluorophosphate, ammonium hexafluorosilicate, ammonium hexafluorotitanate, ammonium hexafluoroniobate, or ammonium hexafluorogermanate. Preferably, an aqueous electrolyte including ammonium hexafluorogermanate is used.

In the solid electrolytic capacitor of the present invention, the dielectric layer comprises the first dielectric layer located on the anode side and the second dielectric layer formed on the first dielectric layer wherein oxygen concentration of the second dielectric layer is decreased from the first dielectric layer side toward the cathode side, therefore, an expansion responsiveness to heat in the second dielectric layer becomes more improved toward the cathode side wherein the oxygen concentration is decreased.

As a consequence, when heat treatment process, such as reflow soldering process, is conducted on the solid electrolytic capacitor of the invention, even though thermal stress is added because of expansion and contraction of the electrolyte layer as described above, the thermal stress in the second dielectric layer is relieved gradually toward the first dielectric layer and the thermal stress acting on the first dielectric layer is relieved, so that occurrence of crack in the dielectric layer is suppressed resulting in prevention of increase of leakage current.

In the solid electrolytic capacitor of the invention, the second dielectric layer contains at least one of elements selected from silicon, phosphorus, titanium, niobium and germanium, in addition to nitrogen and fluorine, therefore, even when heat treatment process, such as reflow soldering process, is conducted, crystallization of the second dielectric layer is suppressed, so that the increase of leakage current because of crystallization of the dielectric layer is more prevented. Especially, when silicon and germanium are contained in the second dielectric layer, the increase of leakage current is more prevented.

Further, in the solid electrolytic capacitor of the invention, fluorine is contained in the first dielectric layer and fluorine concentration therein is increased toward the anode side, therefore, even when heat treatment process, such as reflow soldering process, is conducted, decrease of layer thickness of the dielectric layer by diffusion of oxygen from the dielectric layer to the anode is suppressed, so that the increase of leakage current is more prevented.

In the fabrication method of the solid electrolytic capacitor of the present invention, the anode of valve metals or of alloy of which main component is valve metals is anodized in the aqueous electrolyte including hexafluoride ion, and therefore, the dielectric layer comprising the first dielectric layer located on the anode side and the second dielectric layer formed on the first dielectric layer is formed, oxygen concentration of the second dielectric layer is decreased from the first dielectric layer side toward the cathode side and fluorine is contained in the first dielectric layer and the second dielectric layer.

When the anode of valve metals or alloy of which main component is valve metals is anodized in the aqueous electrolyte including hexafluoride ion, if the aqueous electrolyte including at least one ammonium salt selected from ammonium hexafluorophosphate, ammonium hexafluorosilicate, ammonium hexafluorotitanate, ammonium hexafluoroniobate and ammonium hexafluorogermanate is used, the second dielectric layer including at least one of elements selected from silicon, phosphorus, titanium, niobium and germanium, in addition to nitrogen and fluorine, is formed.

When the anode of valve metals or alloy of which main component is valve metals is anodized in the aqueous electrolyte including hexafluoride ion, a part of the anode surface is dissolved, unevenness is formed on the anode surface and the surface area of the anode is increased, so that capacitance of the solid electrolytic capacitor is increased. Particularly, if the aqueous electrolyte including ammonium hexafluorogermanate is used, it is believed, by advance of dissolution of the anode surface resulting from high oxidization of germanium fluoride, the surface area of the anode is greatly increased, capacitance of the solid electrolytic capacitor is more increased, and crystallization of the dielectric layer is suppressed, so that leakage current is more prevented.

These and other objects, advantages and features of the invention will become apparent from the following description thereof taken in conjunction with the accompanying drawings which illustrate specific embodiments of the invention.

BRIEF DESCRIPTION OF THE DRAWINGS

FIG. 5 is a photograph showing a state of the anode surface after anodizing the anode in Example 1.

DESCRIPTION OF THE PREFERRED EMBODIMENTS

Figure 1:
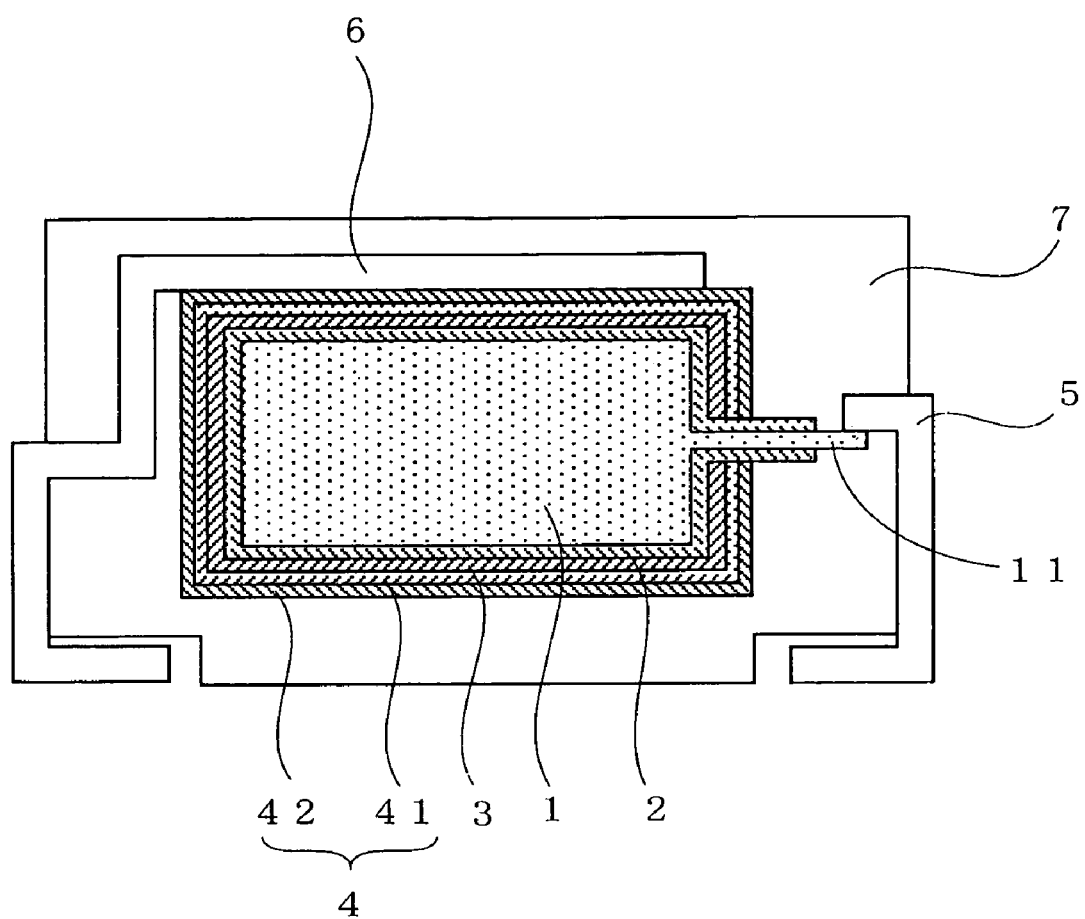
FIG. 1 is a sectional view illustrating a solid electrolytic capacitor of Examples according to the present invention.

Hereinbelow, solid electrolytic capacitors and fabrication methods therefor according to examples of the invention are specifically described, and it will be demonstrated by the comparison with comparative examples that increase of leakage current in examples of the inventive solid electrolytic capacitors is prevented in the case of heat treatment process, such as reflow soldering process, and capacitance is increased. It is to be noted that the solid electrolytic capacitors and fabrication methods therefor of the invention should not be limited to the following examples thereof and suitable changes and modifications may be made thereto within the scope of the invention.

EXAMPLE 1

A solid electrolytic capacitor of Example 1 will be described in details by the reference of the accompanying drawings.

The solid electrolytic capacitor of Example 1 was fabricated as follows. An anode 1 of porous sintered body of niobium was fabricated by sintering powder of niobium metal having an average particle size of 2 μm and a lead 11 of tantalum metal was led out of the anode 1.

Next, 0.1 wt % aqueous solution of ammonium hexafluorosilicate was used in forming a dielectric layer 2 on the surface of said anode 1 by anodizing the anode 1. Subsequently, the anode 1 was anodized by applying a voltage of 8 V for 10 hours between the anode 1 and an opposite electrode in said aqueous solution heated to 60° C. to form the dielectric layer 2 on the surface of the resultant anode 1.

Next, an electrolyte layer 3 of polypyrrole was formed on the dielectric layer 2 formed on the surface of the anode 1 by chemical polymerization, and so on, and a cathode 4 comprising a graphite layer 41 and a silver paste layer 42 was formed on the electrolyte layer 3. In addition to polypyrrole as mentioned above, examples of materials for the electrolyte layer 3 include conducting polymer materials, such as polythiophene or polyaniline and conducting oxides, such as manganese dioxide.

A solid electrolytic capacitor shown in FIG. 1 was fabricated as follows. An anode lead 5 was connected to the lead 11 led out of the anode 1 and a cathode lead 6 was connected to the silver paste layer 42 of the cathode 4. Then, the solid electrolytic capacitor was encapsulated with a resin layer 7 of epoxy resin to thrust the anode lead 5 and the cathode lead 6 outside via the resin layer 7.

Figure 2:
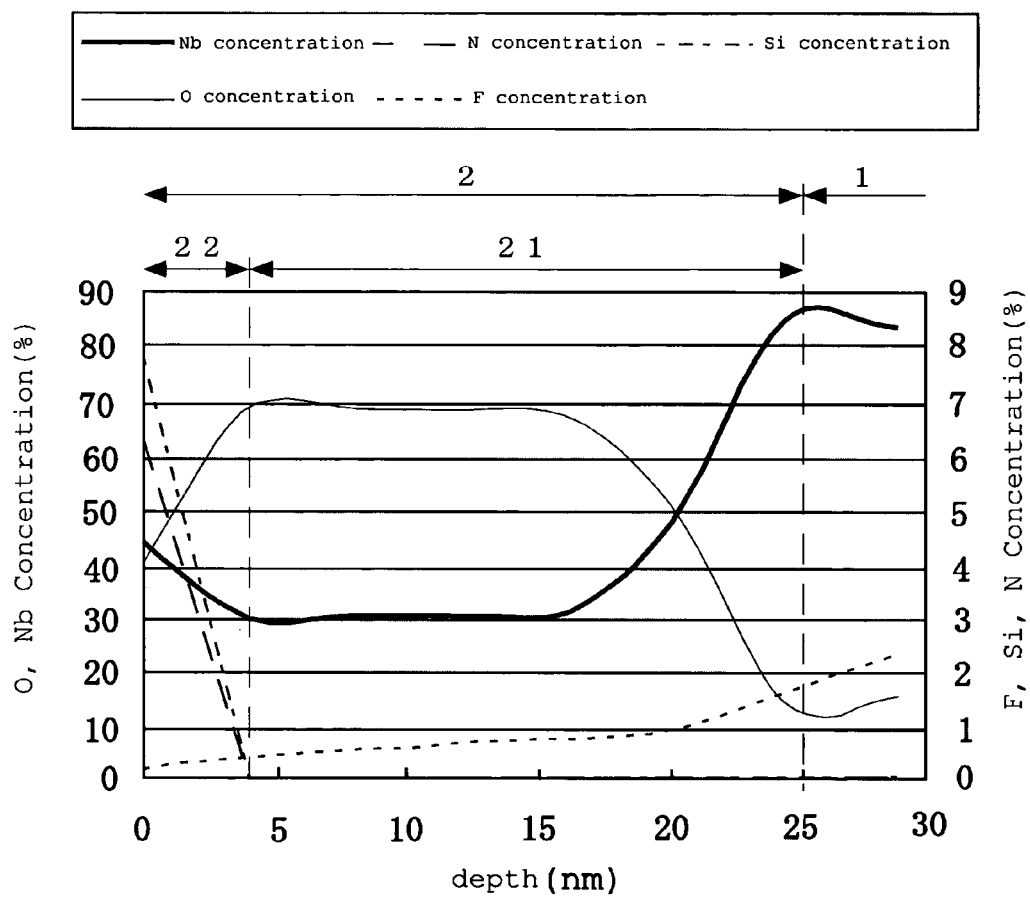
FIG. 2 is a graph showing the result of measuring amount of each element contained in a dielectric layer formed on an anode surface, in a depth direction from the surface of the opposite side of the anode in a solid electrolytic capacitor of Example 1 according to the present invention.

In the dielectric layer 2 formed on the surface of the anode 1, at a stage that the anode 1 was anodized, content of each element was measured by energy dispersive x-ray analysis (EDX) in a depth direction from the surface of the dielectric layer 2 which was the opposite side of the anode 1. The result was shown in FIG. 2.

Figure 3:
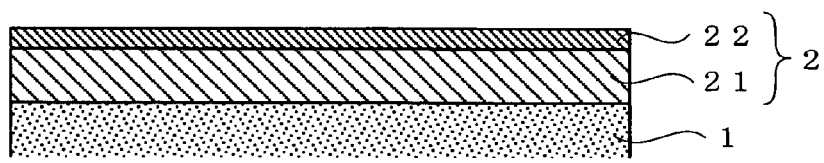
FIG. 3 is a schematic sectional view illustrating a state of the dielectric layer formed on the anode surface in the solid electrolytic capacitor of Examples according to the present invention.

As a consequence, as typically shown in FIG. 3, the dielectric layer 2 was composed of a first dielectric layer 21 located on the surface of the anode 1 and a second dielectric layer 22 formed on the first dielectric layer 21. The second dielectric layer 22 was in the range of depth of about 4 nm degree from the surface of the opposite side of the anode 1. In the second dielectric layer 22, oxygen concentration was decreased toward the surface thereof from the first dielectric layer 21. On the other hand, in the second dielectric layer 22, nitrogen, silicon and fluorine were contained and concentration of nitrogen and silicon was increased toward the surface.

On the other hand, little of nitrogen and silicon was contained in the first dielectric layer 21 which was in a region located in the range of depth from about 4 nm to 25 nm from the surface of the dielectric layer 2. In the first dielectric layer 21, fluorine concentration became increased as the anode 1 became close, and when being over about 17 nm depth from the surface of the second dielectric layer 2, oxygen concentration was extremely decreased while niobium concentration was extremely increased.

EXAMPLE 2

The same procedure as in Example 1 was used to fabricate a solid electrolytic capacitor of Example 2, except that an anode 1 of porous sintered body of titanium formed by sintering powder of titanium metal having an average particle size of 2 μm was used.

EXAMPLE 3

The same procedure as in Example 1 was used to fabricate a solid electrolytic capacitor of Example 3, except that an anode 1 of porous sintered body of niobium alloy whose main component was niobium formed by sintering a mixture wherein powder of niobium metal having an average particle size of 2 μm were mixed with powder of aluminum at a weight ratio of about 99:1 was used.

As a result of examining the dielectric layer 2 formed on the surface of the anode 1 of each solid electrolytic capacitor of Example 2 and Example 3 in the same manner in the case of Example 1, the same as Example 1, the dielectric layer 2 had a structure of being composed of the first dielectric layer 21 located on the surface of the anode 1 and the second dielectric layer 22 formed on the first dielectric layer 21. In the second dielectric layer 22, oxygen concentration was decreased toward the surface thereof from the first dielectric layer 21. On the other hand, in the second dielectric layer 22, nitrogen, silicon and fluorine were contained and concentration of nitrogen and silicon was increased toward the surface. Further, little of nitrogen and silicon was contained in the first dielectric layer 21 and fluorine concentration became increased as the anode 1 became close.

COMPARATIVE EXAMPLE 1

In Comparative Example 1, the same procedure as in Example 1 was used to fabricate a solid electrolytic capacitor having a structure shown in FIG. 1, except that 0.1 wt % phosphate solution was used as aqueous electrolyte in anodizing the anode of sintered body of niobium the same as Example 1.

Figure 4:
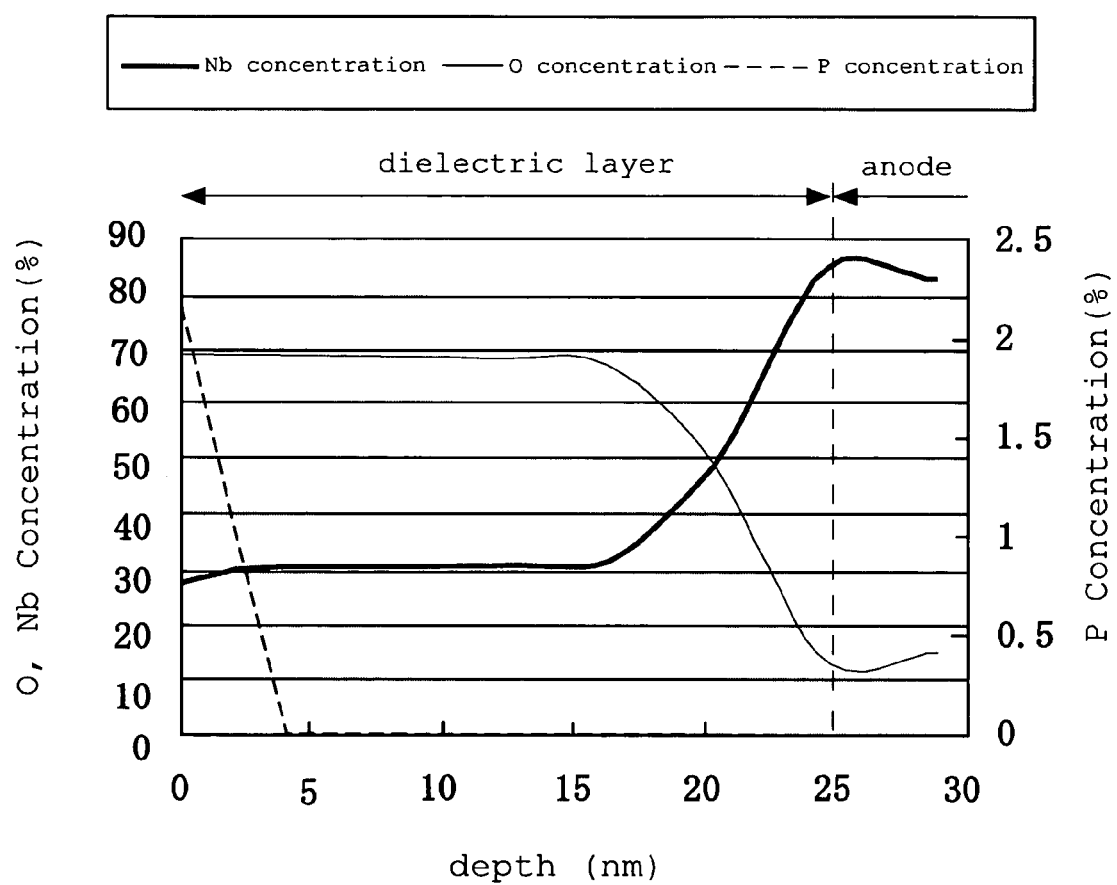
FIG. 4 is a graph showing the result of measuring amount of each element contained in a dielectric layer formed on the anode surface, in a depth direction from the surface of the opposite side of the anode in a solid electrolytic capacitor of Comparative Example 1.

In Comparative Example 1, in a dielectric layer formed in a stage that the anode was anodized in the aqueous electrolyte of 0.1 wt % phosphate solution, content of each element was measured, the same as Example 1, by energy dispersive x-ray analysis (EDX) in the depth direction from the opposite side of the anode which was the surface of the dielectric layer. The result was shown in FIG. 4.

As a consequence, in the dielectric layer of Comparative Example 1, phosphorus was contained in the range of depth of about 4 nm degree from the surface of the dielectric layer, but nitrogen, silicon and fluorine were not contained differently from that of Example 1. Further, in Comparative Example 1, oxygen concentration and niobium concentration were almost fixed until the range of depth of about 17 nm from the surface of the dielectric layer, and oxygen concentration was not decreased on the surface of the dielectric layer as in Example 1. The dielectric layer of Comparative Example 1 was located in the range of depth from about 25 nm from the surface thereof.

COMPARATIVE EXAMPLE 2

In Comparative Example 2, the same procedure as in Example 2 was used to fabricate a solid electrolytic capacitor, except that 0.1 wt % phosphate solution the same as Comparative Example 1 was used as the aqueous electrolyte in anodizing the anode of porous sintered body of titanium the same as Example 2.

COMPARATIVE EXAMPLE 3

In Comparative Example 3, the same procedure as in Example 3 was used to fabricate a solid electrolytic capacitor, except that 0.1 wt % phosphate solution the same as Comparative Example 1 was used as the aqueous electrolyte in anodizing the anode of porous sintered body of niobium alloy the same as Example 3.

As a result of examining the dielectric layer 2 formed on the surface of the anode 1 of each solid electrolytic capacitor of Comparative Example 2 and Comparative Example 3 in the same manner in the case of Example 1, phosphorus was contained to a depth of some degree from the surface of the dielectric layer as in Comparative Example 1, but nitrogen, silicon and fluorine were not contained. Further, in Comparative Example 2 and Comparative Example 3, oxygen concentration and niobium concentration were almost fixed to a certain depth from the surface of the dielectric layer, and oxygen concentration was not decreased on the surface of the dielectric layer as in Example 1.

Figure 6:
FIG. 6 is a photograph showing a state of the anode surface after anodizing the anode in Comparative Example 1.

Further, in each of Example 1 and Comparative Example 1, a state of the anode surface after anodizing the anode as described above was observed by a scanning electron microscope (SEM). The result of observation of Example 1 was shown in FIG. 5 and the result of observation of Comparative Example 1 was shown in FIG. 6. The result of Example 1 showed unevenness was formed on the anode surface after anodizing the anode and the surface area was increased. In contrast, in Comparative Example 1, unevenness on the anode surface after anodizing the anode was not observed. In a case where the anode was anodized as shown in Examples 2 and 3, unevenness was formed on the anode surface after anodizing the anode and the surface area was increased, the same as the Example 1.

Then, each of the resultant solid electrolytic capacitors of Examples 1 to 3 and Comparative Examples 1 to 3 was measured of leakage current in the case of reflow soldering process.

In order to reflow each of the resultant solid electrolytic capacitors, the solid electrolytic capacitors were heat-treated by air reflowing method at a peak temperature of 240° C. for 5 minutes. Then, a voltage of 5 v was applied for 20 seconds to each of the solid electrolytic capacitors after reflow soldering process to measure leakage current. The results were shown in Table 1 below.

In addition, capacitance at a frequency of 120 Hz of each of the solid electrolytic capacitors after reflow soldering process was measured. The results were shown in Table 1 below.

TABLE 1

| | ANODE MATERIAL | TYPE OF AQUEOUS ELECTRO-LYTE | LEAKAGE CURRENT (µA) | CAPACITANCE (µF) |
|---|---|---|---|---|
| EXAMPLE 1 | niobium | ammonium hexafluoro-silicate | 8.0 | 450 |
| EXAMPLE 2 | titanium | ammonium hexafluoro-silicate | 12.4 | 1000 |
| EXAMPLE 3 | niobium alloy | ammonium hexafluoro-silicate | 6.2 | 560 |
| COMPARATIVE EXAMPLE 1 | niobium | phosphoric acid | 160 | 330 |
| COMPARATIVE EXAMPLE 2 | titanium | phosphoric acid | 1480 | 750 |
| COMPARATIVE EXAMPLE 3 | niobium alloy | phosphoric acid | 140 | 420 |

As apparent from the table, in the solid electrolytic capacitors of Examples 1 to 3 provided with the dielectric layer comprising the first dielectric layer located on the anode side and the second dielectric layer formed on the first dielectric layer formed by anodizing the anode of valve metals like niobium in the aqueous electrolyte of ammonium hexafluorosilicate, leakage current after reflow soldering process was remarkably decreased as compared with the solid electrolytic capacitors of Comparative Examples 1 to 3 provided with the above-mentioned dielectric layer formed by anodizing the anode of valve metals like niobium in the aqueous electrolyte of phosphate solution.

In addition, in a comparison between solid electrolytic capacitors using the same valve metals for the anode, in Example 1 and Comparative Example 1, in Example 2 and Comparative Example 2, and in Example 3 and Comparative Example 3, the solid electrolytic capacitors of Examples showed higher capacitance.

EXAMPLES 4 TO 7

In Examples 4 to 7, the same procedure as in Example 1 was used to fabricate each solid electrolytic capacitor, except that type of aqueous electrolyte used in anodizing the anode 1 of porous sintered body of niobium the same as Example 1 was changed.

As each aqueous electrolyte, 0.1 wt % aqueous solution of ammonium hexafluorophosphate was used in Example 4, 0.1 wt % aqueous solution of ammonium hexafluoroniobate was used in Example 5, 0.1 wt % aqueous solution of ammonium hexafluorotitanate was used in Example 6, and 0.1 wt % aqueous solution of ammonium hexafluorogermanate was used in Example 7.

A dielectric layer 2 formed on the surface of the anode 1 of each solid electrolytic capacitor of Examples 4 to 7 was examined in the same manner in the case of Example 1. The results were shown that, the same as Example 1, the dielectric layer 2 was composed of a first dielectric layer 21 located on the surface of the anode 1 and a second dielectric layer 22 formed on the first dielectric layer 21. In the second dielectric layer 22, oxygen concentration was decreased toward the surface of the dielectric layer 2 from the first dielectric layer 21. On the other hand, in the second dielectric layer 22, in addition to nitrogen and fluorine, phosphorus in Example 4, titanium in Example 5, niobium in Example 6 and germanium in Example 7 was each contained. In each of the first dielectric layer 21, fluorine concentration became increased as the anode 1 became close.

Next, the same as above, the solid electrolytic capacitors of Example 4 to 7 were heat-treated by air reflowing method at a peak temperature of 240° C. for 5 minutes. Then, a voltage of 5 v was applied for 20 seconds to each of the solid electrolytic capacitors after reflow soldering process to measure leakage current, together with capacitance at a frequency of 120 Hz. The results were shown together with that of Example 1 in Table 2 below.

TABLE 2

| | ANODE MATERIAL | TYPE OF AQUEOUS ELECTRO-LYTE | LEAKAGE CURRENT (µA) | CAPACITANCE (µF) |
|---|---|---|---|---|
| EXAMPLE 1 | niobium | ammonium hexafluoro-silicate | 8.0 | 450 |
| EXAMPLE 4 | niobium | ammonium hexafluoro-phosphate | 15.6 | 440 |
| EXAMPLE 5 | niobium | ammonium hexafluoro-niobate | 18.2 | 460 |
| EXAMPLE 6 | niobium | ammonium hexafluoro-titanate | 18.8 | 470 |
| EXAMPLE 7 | niobium | ammonium hexafluoro-germanate | 7.4 | 600 |

As apparent from the table, the same as Examples 1 to 3, in each of the solid electrolytic capacitors of Examples 4 to 7, leakage current after reflow soldering process was remarkably decreased as compared with the solid electrolytic capacitor of Comparative Examples 1 to 3. Particularly, the solid electrolytic capacitors of Examples 1 and 7 wherein the anode 1 of porous sintered body of niobium was anodized in the aqueous solution of ammonium hexafluorosilicate or the aqueous solution of ammonium hexafluorogermanate, and silicon or germanium was contained in the second dielectric layer 22, showed remarkably decreased leakage current after reflow soldering process.

Further, the solid electrolytic capacitor of Example 7 wherein the anode 1 of the porous sintered body of niobium was anodized in the aqueous solution of ammonium hexafluorogermanate showed remarkably increased capacitance.

Although the present invention has been fully described by way of examples, it is to be noted that various changes and modifications will be apparent to those skilled in the art.

Therefore, unless otherwise such changes and modifications depart from the scope of the invention, they should be construed as being included therein.

The invention claimed is:

1. A solid electrolytic capacitor comprising: an anode of valve metals or alloy of which main component is valve metals; a dielectric layer formed by anodizing said anode; and a cathode formed on said dielectric layer;

wherein the dielectric layer comprises a first dielectric layer located on the anode side and a second dielectric layer formed on said first dielectric layer, and oxygen concentration of said second dielectric layer is decreased from the first dielectric layer side toward the cathode side.

2. The solid electrolytic capacitor according to claim 1, wherein the valve metals are niobium or titanium.

3. The solid electrolytic capacitor according to claim 1, wherein the second dielectric layer contains at least one element selected from silicon, phosphorus, titanium, niobium and germanium, in addition to nitrogen and fluorine.

4. The solid electrolytic capacitor according to claim 3, wherein the second dielectric layer contains nitrogen, fluorine and silicon.

5. The solid electrolytic capacitor according to claim 1, wherein fluorine is contained in the first dielectric layer and fluorine concentration therein is increased toward the anode side from the first dielectric layer side.

6. The solid electrolytic capacitor according to claim 1, wherein the anode is a porous body or a sintered body.

7. The solid electrolytic capacitor according to claim 1, wherein the surface area of the anode is increased by anodizing the anode.

* * * * *